W. F. RICHARDS.
DYNAMO SUSPENSION.
APPLICATION FILED JUNE 26, 1915.
1,171,649.
Patented Feb. 15, 1916.
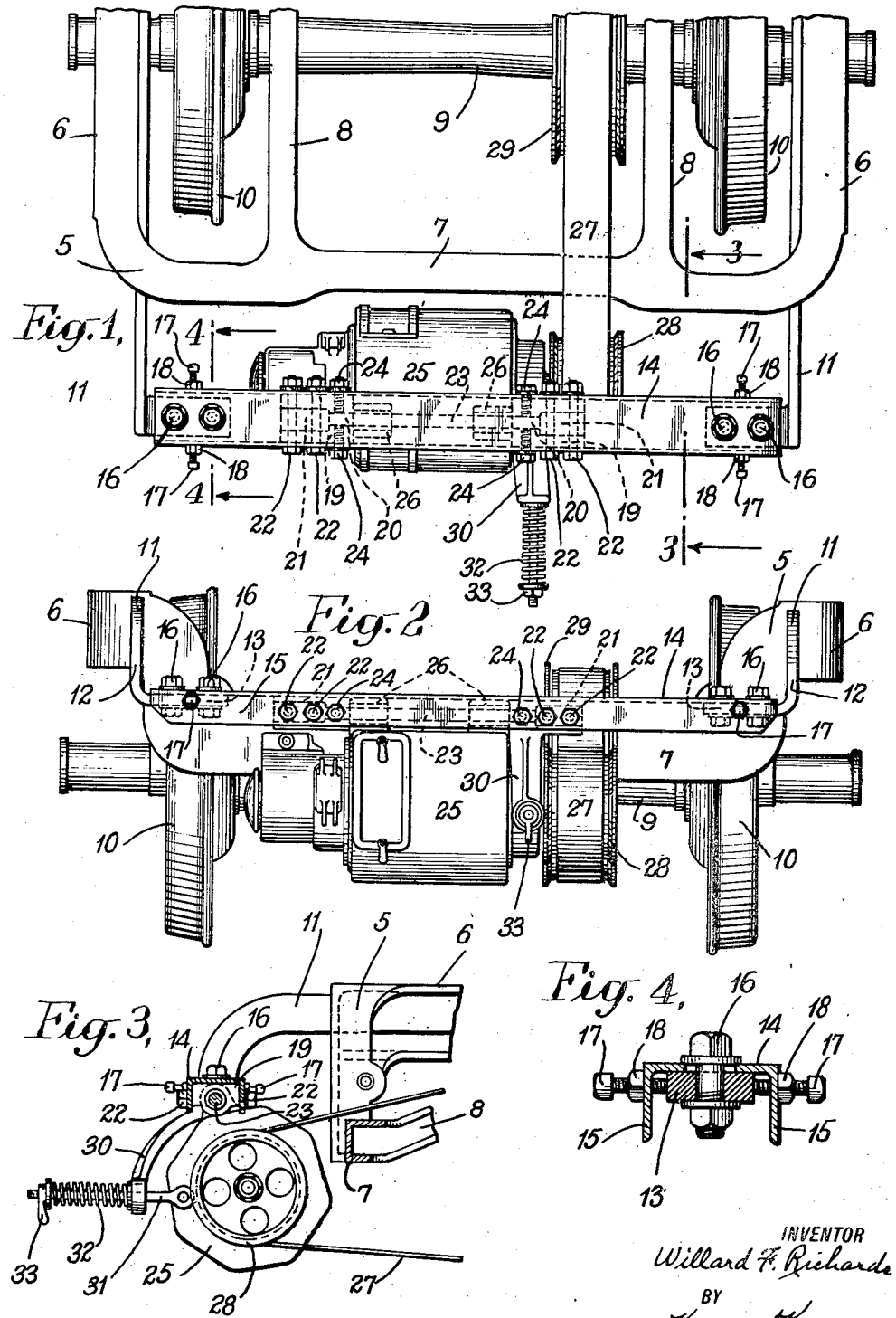
INVENTOR
Willard F. Richards
BY
Kenyon & Kenyon
ATTORNEYS

UNITED STATES PATENT OFFICE.

WILLARD F. RICHARDS, OF BUFFALO, NEW YORK, ASSIGNOR TO GOULD COUPLER COMPANY, A CORPORATION OF NEW YORK.

DYNAMO SUSPENSION.

1,171,649.  Specification of Letters Patent.  Patented Feb. 15, 1916.

Application filed June 26, 1915. Serial No. 36,442.

*To all whom it may concern:*

Be it known that I, WILLARD F. RICHARDS, a citizen of the United States, and a resident of Buffalo, county of Erie, and State of New York, have invented certain new and useful Improvements in Dynamo Suspensions, of which the following is a specification.

My invention relates to dynamo suspensions for car trucks, and more particularly to suspensions in which the dynamo is driven from an axle of the truck.

The main object of my invention is to simplify the construction of suspensions and to provide an arrangement which is easily assembled and from which the dynamo is easily removed and is readily accessible for inspection and repair.

Further objects, features and advantages will more clearly appear from the detail description given below, taken in connection with the accompanying drawings, which form a part of this specification.

In the drawings, Figure 1 is a plan view of part of a car truck having a suspension embodying my improvements in one form; Fig. 2 is a front view of the same; Fig. 3 is a section taken on the line 3—3 of Fig. 1; and Fig. 4 is a section taken on the line 4—4 of Fig. 1.

In the drawings, 5 represents a car truck having side sills 6, a depressed end sill 7 and safety sills 8. An axle of the truck is shown at 9, with car wheels 10. Extending from the truck are two supporting bars 11, each secured adjacent one of the side sills of the truck and passing through suitable openings in the end sill, the outer ends of the bars 11 being bent downwardly at 12 and inwardly toward one another at 13. Connecting the outer ends of the bars 11 is a cross bar 14 in the form of channel iron, lying below the side sills of the truck to avoid the center sill of the car, and having depending side flanges 15, the ends of the cross bar resting upon the ends 13 of the bars 11 and bolted thereto by means of bolts 16. The apertures in the channel bar 14 are elongated, as shown in Fig. 4, so that the bar may be adjusted relatively to the axle to properly aline the dynamo with the axle. To securely hold the bar in adjusted position, side screw bolts 17 are provided in the flanges 15, the bolts 17 having lock nuts 18. Secured between the flanges 15, intermediate the ends of the bar 14, are two pivot blocks 19, shown in dotted lines in Figs. 1 and 2, which blocks have alined apertures 20 extending therethrough, which apertures are enlarged at their outer ends, as at 21. The blocks 19 are secured to the flanges 15 by means of bolts 22 passing through the flanges and the blocks near their outer ends. A pivot rod 23 has each end extending into the reduced end of one of the apertures 20 and is rigidly held therein by screw bolts 24. The dynamo is shown at 25 provided with lugs 26, through which the rod 23 passes, so that it is pivoted thereto and pivotally supported by the bar 14. The dynamo is driven from the axle 9 by means of a belt 27 passing over a pulley 28 on the dynamo and a pulley 29 on the axle. The righthand block 19 has an integral outwardly downwardly extending arm 30, having an apertured lower end and carrying a tension device comprising a link 31 having its inner end pivoted to the dynamo and a spring 32 coiled about its outer end and compressed against the arm 30 by means of a hand nut 33, so that it tends to swing the dynamo away from the axle, to maintain proper tension on the belt.

It will be seen that the dynamo is at all times easily accessible and the suspension has few parts, all of which are simple and easily and cheaply constructed. The dynamo may be easily removed by removing the bolts 22, 24, and the hand nut 33, when the blocks 19 with the dynamo will drop down free of the rest of the suspension.

While I have described one embodiment of my invention in great detail, I do not desire to be limited to the details shown and described, since many changes and modifications may be made, and I intend to cover all arrangements coming within the scope of the appended claims.

What I claim as new and desire to secure by Letters Patent is:—

1. A dynamo suspension having, in combination with a car truck, two supporting bars secured one adjacent each side sill of the truck and extending from the truck and bent downwardly and inwardly toward one another, a cross bar with depending flanges connecting the outer inwardly bent ends of said supporting bars, pivot blocks secured between said flanges, a dynamo pivotally supported from said pivot blocks, and a belt driving the dynamo from an axle of the truck.

2. A dynamo suspension having, in combination with a car truck, two supporting bars secured one adjacent each side sill of the truck and extending from the truck and bent downwardly and inwardly toward one another, a cross bar with depending flanges connecting the outer inwardly bent ends of said supporting bars, pivot blocks secured between said flanges, a dynamo pivotally supported from said pivot blocks, a belt driving the dynamo from an axle of the truck, an arm extending outwardly and downwardly from said cross bar, and tension means carried by said arm tending to swing the dynamo to maintain tension on the belt.

3. A dynamo suspension having, in combination with a truck, two supporting bars extending from the truck having their outer ends bent downwardly and inwardly toward one another, a cross bar with depending flanges connecting the outer inwardly bent ends of said supporting bars, pivot blocks secured between said flanges, a dynamo pivotally supported from said pivot blocks, and a belt driving the dynamo from an axle of the truck.

4. A dynamo suspension having, in combination with a truck, two supporting bars extending from the truck, a cross bar with depending flanges connecting the outer of said supporting bars, pivot blocks secured between said flanges, a dynamo pivotally supported from said pivot blocks, and a belt driving the dynamo from an axle of the truck.

5. A dynamo suspension having, in combination with a car truck, two supporting bars extending from the truck having their outer ends bent downwardly and inwardly toward one another, a cross bar connecting the outer inwardly bent ends of said supporting bars, said cross bar having flanges, pivot blocks secured between said flanges, a dynamo pivotally carried by said blocks, and a belt driving the dynamo from an axle of the truck.

6. A dynamo suspension having, in combination with a car truck, two supporting bars extending from the truck having their outer ends bent downwardly, a cross bar connecting the outer downwardly bent ends of said supporting bars, said cross bar having flanges, pivot blocks secured between said flanges, a dynamo pivotally carried by said blocks, and a belt driving the dynamo from an axle of the truck.

7. A dynamo suspension having, in combination with a car truck, two supporting bars extending from the truck, a cross bar connecting the outer ends of said supporting bars, said cross bar having flanges, pivot blocks secured between said flanges, a dynamo pivotally carried by said blocks, and a belt driving the dynamo from an axle of the truck.

8. A dynamo suspension having, in combination with a car truck, two supporting bars extending from the truck, a cross bar connecting the outer ends of said supporting bars, said cross bar having flanges, pivot blocks secured between said flanges, a dynamo pivotally carried by said blocks, a belt driving the dynamo from an axle of the truck, an arm extending outwardly and downwardly from said cross bar, and tension means carried by said arm tending to swing the dynamo to maintain tension on the belt.

9. A dynamo suspension having, in combination with a car truck, two supporting bars extending from the truck having their outer ends bent downwardly and inwardly toward one another, a cross bar connecting the outer inwardly bent ends of said supporting bars, and a dynamo pivotally supported by said cross bar.

10. A dynamo suspension having, in combination with a car truck, two supporting bars extending from the truck having their outer ends bent downwardly, a cross bar connecting the outer downwardly bent ends of said supporting bars, and a dynamo pivotally supported by said cross bar.

11. A dynamo suspension having, in combination with a car truck, two supporting bars extending from the truck, a cross bar connecting the outer ends of said supporting bars, a dynamo pivotally supported by said cross bar, an arm extending outwardly and downwardly from said cross bar, and tension means carried by said arm tending to swing the dynamo to maintain tension on the belt.

12. A dynamo suspension having, in combination with a car truck, a transverse channel bar supported outside the truck, two blocks secured between the flanges of the bar on the underneath side of the bar, said blocks having alined apertures therethrough, a pivot rod having its ends extending into said apertures, and a dynamo pivotally supported on said rod.

13. A dynamo suspension having, in combination with a car truck, a transverse channel bar supported outside the truck, two blocks secured between the flanges of the bar, said blocks having alined apertures, a pivot rod having its ends extending into said apertures, and a dynamo pivotally supported on said rod.

14. A dynamo suspension having in combination with a car truck, a transverse bar having side flanges supported outside the truck, two blocks secured between the flanges of the bar on the underneath side of the bar, said blocks having alined apertures therethrough, a pivot rod having its ends extending into said apertures, and a dynamo pivotally supported on said rod.

15. A dynamo suspension having, in combination with a car truck, a transverse bar having side flanges supported outside the truck, two blocks secured between the flanges of the bar, said blocks having alined apertures, a pivot rod having its ends extending into said apertures, and a dynamo pivotally supported on said rod.

16. A dynamo suspension having, in combination with a car truck, a transverse bar having side flanges supported outside the truck, two blocks secured between the flanges of the bar, said blocks having alined apertures, a pivot rod having its ends extending into said apertures, a dynamo pivotally supported on said rod, and a belt driving the dynamo from an axle of the truck, said bar being adjustable relatively to the axle to properly aline the driving belt.

17. A dynamo suspension having, in combination with a car truck, a transverse bar having side flanges supported outside the truck, two blocks secured between the flanges of the bar, said blocks having alined apertures, a pivot rod having its ends extending into said apertures, a dynamo pivotally supported on said rod, a belt driving the dynamo from an axle of the truck, an arm extending outwardly and downwardly from said cross bar, and tension means carried by said arm tending to swing the dynamo to maintain tension on the belt.

18. A dynamo suspension having, in combination with a car truck, a supporting frame extending from the truck and comprising a cross bar rigid with the truck, two blocks rigidly carried by said cross bar intermediate its ends, a pivot rod having one end secured to each block, and a dynamo pivotally supported by said pivot rod.

19. A dynamo suspension having, in combination with a car truck, a supporting frame comprising a cross bar rigid with the truck, two blocks rigidly carried by said cross bar, a pivot rod having one end secured to each block, and a dynamo pivotally supported by said pivot rod.

20. A dynamo suspension having, in combination with a car truck, a supporting frame comprising a cross bar rigid with the truck, two blocks rigidly carried by said cross bar, a pivot rod having one end secured to each block, and a dynamo pivotally supported by said pivot rod, said cross bar being below the side sills of the truck.

21. A dynamo suspension having, in combination with a car truck, a supporting frame extending from the truck and comprising a cross bar rigid with the truck, a pivot rod rigidly carried by the cross bar intermediate its ends, and a dynamo pivotally suspended from said cross bar.

22. A dynamo suspension having, in combination with a car truck, a supporting frame extending from the truck and comprising a cross bar rigid with the truck, a pivot rod carried by the cross bar, and a dynamo pivotally supported by said cross bar.

23. A dynamo suspension having, in combination with a car truck, a supporting frame extending from the truck and comprising a cross bar rigid with the truck, a pivot rod carried by the cross bar, a dynamo pivotally supported by said cross bar, and means for rigidly securing said rod with respect to said cross bar.

24. A dynamo suspension having, in combination with a car truck, a supporting frame extending from the truck and comprising a cross bar rigid with the truck, means rigidly carried by said cross bar intermediate its ends, a pivot rod having each end secured to said means, and a dynamo pivotally supported by said pivot rod.

25. A dynamo suspension having, in combination with a car truck, a supporting frame extending from the truck and comprising a cross bar rigid with the truck, means rigidly carried by said cross bar, a pivot rod having each end secured to said means, and a dynamo pivotally supported by said pivot rod, said means having alined apertures in which the ends of said rod are secured.

In testimony whereof, I have signed my name to this specification.

WILLARD F. RICHARDS.